US012599837B2

(12) United States Patent
Iizuka

(10) Patent No.: US 12,599,837 B2
(45) Date of Patent: Apr. 14, 2026

(54) SIGNAL GENERATION DEVICE, SIGNAL GENERATION METHOD, AND PROGRAM

(71) Applicant: Murata Manufacturing Co., Ltd., Nagaokakyo (JP)

(72) Inventor: Yosuke Iizuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 252 days.

(21) Appl. No.: 18/454,342

(22) Filed: Aug. 23, 2023

(65) Prior Publication Data

US 2023/0390635 A1    Dec. 7, 2023

Related U.S. Application Data

(63) Continuation of application No. PCT/JP2022/007643, filed on Feb. 24, 2022.

(30) Foreign Application Priority Data

Feb. 25, 2021    (JP) ................................. 2021-028415

(51) Int. Cl.
*A63F 13/285*        (2014.01)
*A63F 13/22*         (2014.01)
*A63F 13/42*         (2014.01)
*G06F 3/01*          (2006.01)

(52) U.S. Cl.
CPC ............ *A63F 13/285* (2014.09); *A63F 13/22* (2014.09); *A63F 13/42* (2014.09); *G06F 3/01* (2013.01)

(58) Field of Classification Search
CPC ........ A63F 13/285; A63F 13/22; A63F 13/42; G06F 3/01
See application file for complete search history.

(56) References Cited

U.S. PATENT DOCUMENTS

| | | | | |
|---|---|---|---|---|
| 12,321,532 B2 * | 6/2025 | Gilg | ..................... | H05B 47/165 |
| 2006/0129719 A1 * | 6/2006 | Cruz-Hernandez | ......................... | G06F 3/0488 710/58 |
| 2008/0294984 A1 | 11/2008 | Ramsay et al. | | |
| 2014/0055358 A1 | 2/2014 | Birnbaum et al. | | |
| 2015/0070148 A1 | 3/2015 | Cruz-Hernandez et al. | | |
| 2015/0130707 A1 * | 5/2015 | Da Costa | ................ | G06F 3/016 345/156 |

(Continued)

FOREIGN PATENT DOCUMENTS

| | | |
|---|---|---|
| JP | 2010528394 A | 8/2010 |
| JP | 2014044722 A | 3/2014 |

(Continued)

OTHER PUBLICATIONS

International Search Report in PCT/JP2022/007643, mailed May 24, 2022, 3 pages.

*Primary Examiner* — Carl V Larsen
(74) *Attorney, Agent, or Firm* — ArentFox Schiff LLP

(57) ABSTRACT

A technique is provided to present more intuitive settings of a haptic sensation. In particular, a signal generation device is provided that includes an input unit to accept setting information including information indicative of the direction of the haptic sensation to be presented by a target object; and a generation unit that generates a waveform signal for presenting the haptic sensation based on the setting information accepted by the input unit.

19 Claims, 13 Drawing Sheets

(56) References Cited

U.S. PATENT DOCUMENTS

| | | | |
|---|---|---|---|
| 2015/0355712 A1* | 12/2015 | Rihn | A63F 13/285 |
| | | | 340/407.2 |
| 2017/0090577 A1 | 3/2017 | Rihn | |
| 2019/0015744 A1* | 1/2019 | Ueda | A63F 13/24 |
| 2020/0122028 A1* | 4/2020 | Konishi | A63F 13/79 |
| 2021/0275905 A1* | 9/2021 | Doucet | A63F 13/54 |
| 2021/0346792 A1* | 11/2021 | Ito | A63F 13/285 |
| 2022/0063723 A1 | 3/2022 | Tsuda | |
| 2022/0091676 A1 | 3/2022 | Oishi et al. | |
| 2022/0187916 A1* | 6/2022 | Nakagawa | G06N 20/00 |
| 2022/0193538 A1* | 6/2022 | Goh | G06V 40/20 |
| 2022/0276710 A1* | 9/2022 | Yokoyama | G06F 1/163 |
| 2022/0277625 A1 | 9/2022 | Chigira et al. | |

FOREIGN PATENT DOCUMENTS

| | | | |
|---|---|---|---|
| JP | 2015053054 A | 3/2015 | |
| JP | 2018528534 A | 9/2018 | |
| JP | 2019185811 A | 10/2019 | |
| JP | 2020112944 A | 7/2020 | |
| JP | 2021026618 A | 2/2021 | |
| WO | 2019043787 A1 | 3/2019 | |
| WO | 2020/230887 A1 | 11/2020 | |
| WO | 2020/241797 A1 | 12/2020 | |
| WO | 2021/005681 A1 | 1/2021 | |

* cited by examiner

Fig. 1

REFERENCE WAVEFORM A

REFERENCE WAVEFORM B

DIRECTIONAL INTENSITY WAVEFORM

TIME AXIS DIRECTION

DIRECTIONAL WEIGHTING ON TIMELINE

FORWARD DIRECTION (+)

DOWNWARD DIRECTION (−)

TIME AXIS DIRECTION

→ TIME AXIS (1) FORWARD
DIRECTIONAL
HAPTIC WAVEFORM (2) BACKWARD
DIRECTIONAL
HAPTIC WAVEFORM (3) DIRECTIONAL
INTENSITY
PARAMETER (4) DIRECTION-
ADAPTED
WAVEFORM (5) WAVEFORM WITH DIRECTION AND INTENSITY SET

COMPUTER 11a

111 PARAMETER INPUT UNIT

112 SIGNAL GENERATION UNIT

113 DEVICE OUTPUT UNIT

21 CONTROLLER

Figure 11:
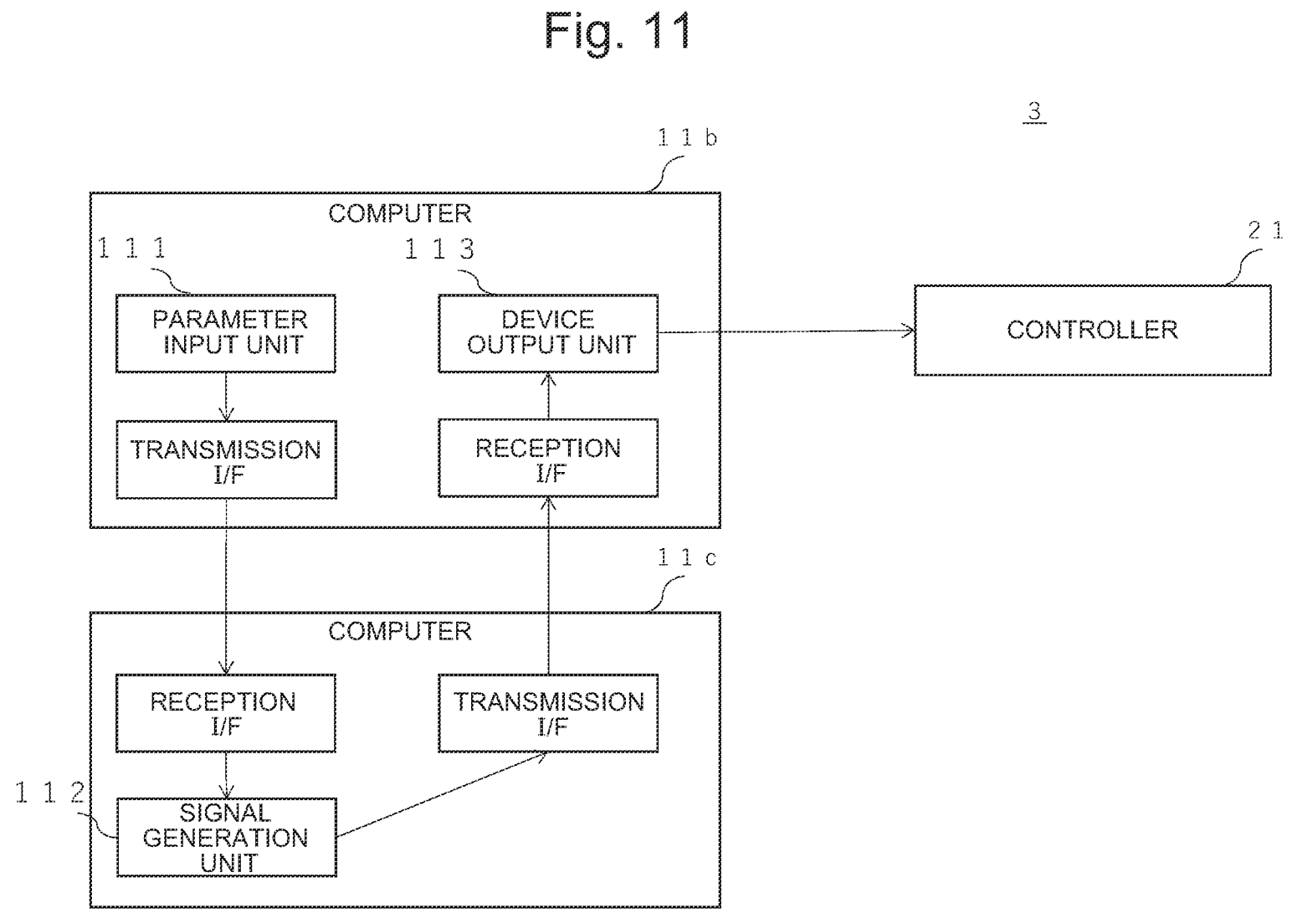

CONTROLLER

11b

COMPUTER

111

PARAMETER INPUT UNIT

TRANSMISSION I/F

DEVICE OUTPUT UNIT

113

RECEPTION I/F

11c

COMPUTER

RECEPTION I/F

SIGNAL GENERATION UNIT

112

TRANSMISSION I/F

Fig. 13

CONTROLLER

21

11g

COMPUTER

RECEPTION I/F

113

DEVICE
OUTPUT UNIT

31

STORAGE MEDIUM

3

SIGNAL GENERATION DEVICE, SIGNAL GENERATION METHOD, AND PROGRAM

CROSS REFERENCE TO RELATED APPLICATIONS

This application is a continuation of International Application No. PCT/JP2022/007643, filed Feb. 24, 2022, which claims priority to Japanese Patent Application No. 2021-028415, filed Feb. 25, 2021, the entire contents of each of which are hereby incorporated by reference in their entirety.

TECHNICAL FIELD

The present invention relates to a signal generation device, a signal generation method, and a signal generation program.

BACKGROUND

Haptic technology to present a sensation, such as a haptic sensation by generating vibration, is known. For example, Japanese Patent Application Publication No. 2018-528534 (hereinafter "Patent Document 1") discloses a technique to modify parameters, such as start time, duration, loop count, clip length, signal type, strength type, signal gap, signal width, gap first, link gap to width, and signal shape, in order to edit haptic effects. Moreover, Japanese Patent Application Publication No. 2010-528394 (hereinafter "Patent Document 2") discloses a technique to change parameters of the frequency and amplitude of vibration in order to customize haptic output. Furthermore, Japanese Patent Application Publication No. 2014-044722 (hereinafter "Document 3") discloses a technique to customize haptic parameters, such as size, duration, frequency, and waveform.

SUMMARY OF INVENTION

In view of the foregoing, a technique that more intuitively sets a haptic sensation to be presented is required. Thus, it is an object of the present invention to provide a technique related to more intuitive settings of a haptic sensation to be presented.

In an exemplary aspect, a signal generation device is provided that includes an input unit configured to accept setting information including information indicative of the direction of a haptic sensation to be presented from a target object; and a generation unit configured to generate a waveform signal for presenting the haptic sensation based on the setting information accepted by the input unit.

In another exemplary aspect, a signal generation method is provided that includes accepting setting information including information indicative of the direction of a haptic sensation to be presented from a target object; and generating a waveform signal for presenting the haptic sensation based on the accepted setting information.

In yet another exemplary aspect, a system is provided that includes memory and a processor for executing a program stored on the memory that causes a computer to function as an input that accepts setting information including information indicative of the direction of a haptic sensation to be presented from a target object; and a generation unit that generates a waveform signal for presenting the haptic sensation based on the setting information accepted by the input unit.

According to the exemplary aspects of the present invention, a technique is provided that is related to more intuitive settings of a haptic sensation to be presented.

BRIEF DESCRIPTION OF DRAWINGS

FIG. 1 is a diagram illustrating a schematic configuration of a game development system according to an exemplary embodiment.

FIG. 10 is a block diagram illustrating an example of a configuration of a signal generation device.

FIG. 11 is a block diagram illustrating another example of the configuration of the signal generation device.

FIG. 13 is a block diagram illustrating yet another example of the configuration of the signal generation device.

DETAILED DESCRIPTION OF EMBODIMENTS

Figure 2:
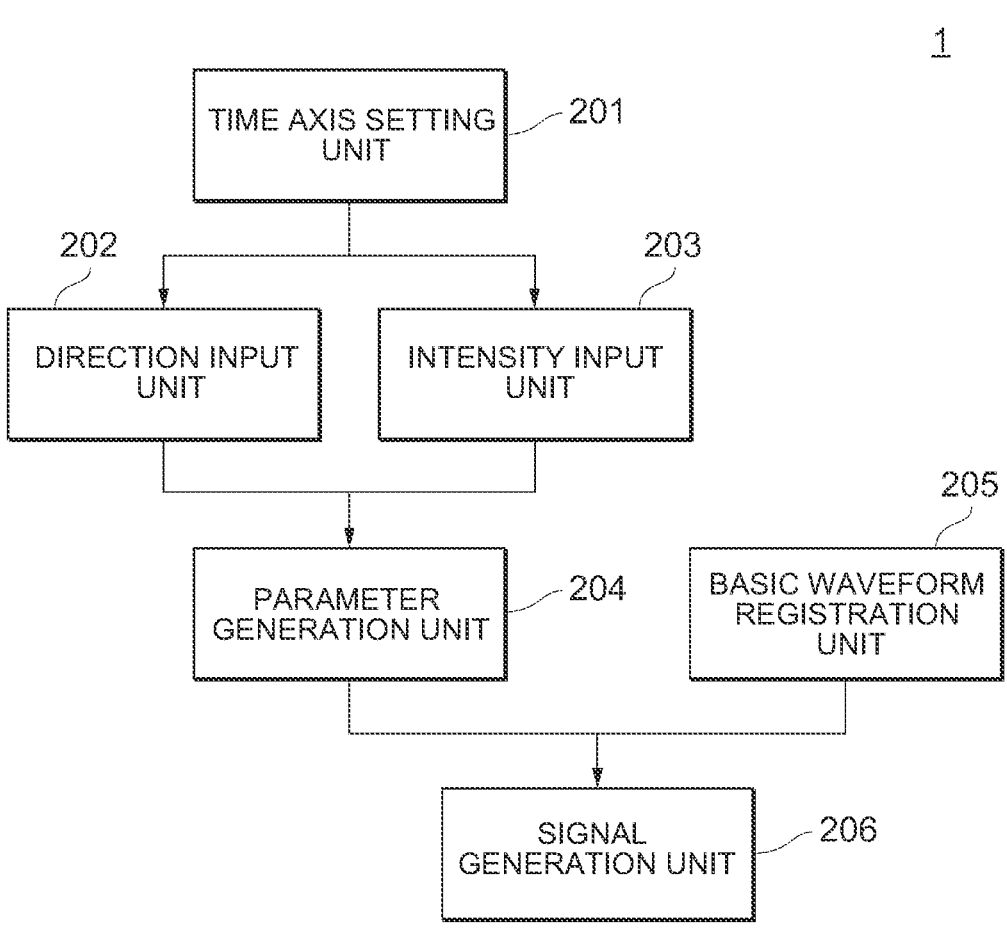
FIG. 2 is a block diagram illustrating the functional configuration of a signal generation device according to an exemplary embodiment.

An exemplary embodiment of the present invention will be described in detail below with reference to the accompanying drawings. It is noted that the same elements are given the same reference numerals to omit redundant description as much as possible.

Figure 1:
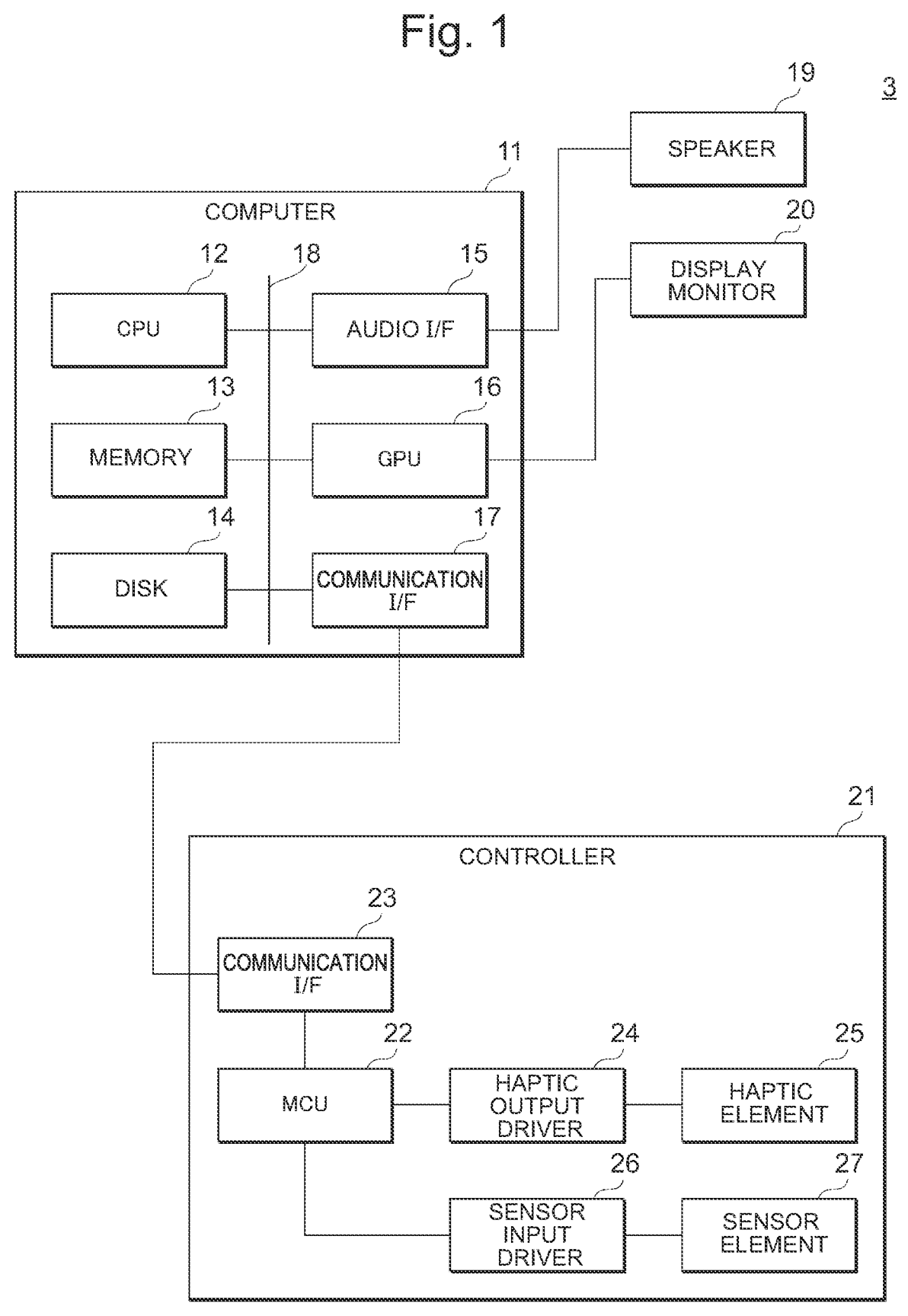

In particular, a game development system according to an exemplary embodiment will be described. FIG. 1 is a diagram illustrating a schematic configuration of the game development system according to the exemplary embodiment. As illustrated in FIG. 1, a game development system 3 mainly includes a computer 11, a speaker 19, a display monitor 20, and a controller 21 (e.g., a target object). Further, though not illustrated, the game development system 3 can include operation parts (such as a mouse and a keyboard for user operations) connected to the computer 11 separately from the controller 21. Further, such a configuration that the game development system 3 includes one computer 11 is illustrated in FIG. 1, but two or more computers 11 may be included to provide the functionality of the computer 11 to be described later.

The computer 11 is a computer configured to create a game program and execute the created game program (e.g., for testing). For example, the computer 11 displays, on the display monitor 20, a user interface for creating the game program so that the game program can be created according to user input accepted through an operation part (not illustrated), such as the keyboard or the mouse. Further, the computer 11 executes the created game program and displays, on the display monitor 20, images representing a virtual reality deployed by the game program, and further outputs audio from the speaker 19. For example, a user recognizes the situation of a character in the virtual reality projected on the display monitor 20, and operates the controller 21 to give movement to the character according to the situation. The computer 11 executes the game program according to the details of the operations performed on the controller 21.

Further, the computer 11 is configured to transmit control signals including a waveform signal to the controller 21 to present at least one of "force sense," "pressure sense," and "tactile sense" by haptics (which may also be called "haptic sensation") from the controller 21 to the user (hereinafter, also called haptic presentation"). For purposes of this disclosure, for example, the "force sense" includes a feel when being pulled or pushed, and a feel of shock when the target is pressed hard or an object bursts. The "pressure sense" is, for example, a sense of touch when touching an object or when feeling the hardness or softness of the object. The "tactile sense" is, for example, a feeling of touch on the surface of the object, or a tactile sensation and a feeling of roughness such as an uneven degree of the surface of the object.

According to an exemplary aspect, the hierarchy of software and hardware in the computer 11 is composed of a game program in an application layer, an SDK (Software Development Kit) in a middle layer, and system/game engine/HW (Hardware) in a physical layer.

The SDK includes, for example, plugins or an authoring tool and middleware. In the middleware, a program for vibrating the controller 21 to give the user 6 at least one of the "force sense," the "pressure sense," and the "tactile sense" (hereinafter, which may also be called a target program) is included. For example, when a specific event has occurred to a character, the game program calls the target program according to an API (Application Programming Interface). At this time, for example, the game program passes, to the target program, event information indicative of the type of event and the start time of the event. The type of event is identified, for example, by an ID.

The specific event is, for example, that an external force to pull or push the character is applied to the character in the virtual reality, that the character shot a gun, that the character was hit, that an explosion occurred near the character, that the character is dancing to the music, or the like.

Based on the event information, the target program is configured to generate a waveform signal for presenting a haptic sensation according to the type of event indicated by the event information. The target program transmits the generated waveform signal to the controller 21 through a game engine, an operating system, and hardware.

The controller 21 is configured to vibrate based on the waveform signal to present the haptic sensation. A user playing the game can hold the vibrating controller 21 by hand to recognize the situation of the character in the virtual reality by at least one of the "force sense," the "pressure sense," and the "tactile sense" in addition to sight and hearing.

Referring next to FIG. 1, the hardware configuration of the game development system according to the exemplary embodiment will be described. In particular, the computer 11 includes a CPU (Central Processing Unit) 12, a memory 13, a disk 14, an audio interface (I/F) 15, a GPU (Graphics Processing Unit) 16, a communication interface (I/F) 17, and a bus 18. The controller 21 includes an MCU (Micro Controller Unit) 22, a communication interface (I/F) 23, a haptic output driver 24, a haptic element 25, a sensor input driver 26, and a sensor element 27.

In the computer 11, the CPU 12, the memory 13, the disk 14, the audio interface 15, the GPU 16, and the communication interface 17 are connected to one another through the bus 18 to be able to transmit and receive data to and from one another.

In the exemplary embodiment, the disk 14 is a non-volatile storage device configured for reading and writing data, such as an HDD (Hard Disk Drive), on which programs (code) such as the game program and the SDK are stored. It is noted that the disk 14 is not limited to the HDD, and it may also be any other storage medium, such as an SSD (Solid State Drive), a memory card, a read-only CD-ROM (Compact Disc Read Only Memory), or a DVD-ROM (Digital Versatile Disc-Read Only Memory). Further, the programs, such as the target program, can be installed externally. Further, the programs such as the target program circulate in such a state as to be stored on a storage medium readable by the computer 11 like the disk 14. It is also noted that the programs, such as the target program, can also circulate on the Internet connected via the communication interface.

The memory 13 is a volatile storage device such as a DRAM (Dynamic Random Access Memory). The communication interface 17 is configured to transmit and receive various data to and from the communication interface 23 in the controller 21. This communication may be performed by wire or wirelessly, and any communication protocol may be used as long as the communication with each other can be performed. Moreover, the communication interface 17 is configured to transmit various data to the controller 21 according to instructions from the CPU 12. Further, the communication interface 17 is configured to receive various data transmitted from the controller 21, and outputs the received data to the CPU 12.

Upon execution of a program, the CPU 12 transfers, to the memory 13, the program stored on the disk 14 and data required to execute the program. The CPU 12 reads, from the memory 13, processing instructions and data required to execute the program, and executes arithmetic processing according to the content of the processing instructions. At this time, the CPU 12 can newly generate data required to execute the program and store the data in the memory 13. Note that the CPU 12 is not limited to acquiring the program and data from the disk 14, and the CPU 12 may also acquire the program and data from a server or the like via the Internet.

Specifically, for example, the CPU 12 creates a game program according to user operations, and stores the created game program in a storage unit such as the memory 13 or the disk 14. Further, for example, upon execution of the created game program, the CPU 12 receives the details of operations of the user to the controller 21 to execute processing instructions according to the operation details in order to give movement to the character in the virtual reality. At this time, the CPU 12 performs processing for haptic presentation, video display, and audio output according to the situation of the character in the virtual reality.

More specifically, for example, when the external force to pull or push the character is applied to the character in the virtual reality, for example, the CPU 12 is configured to generate a waveform signal for haptic presentation of the force sense when the external force is applied.

Further, for example, when the character shot a gun in the virtual reality, the CPU 12 is configured to generate a waveform signal for haptic presentation of a sense of reaction when the character shot the gun.

Further, for example, when the character was hit in the virtual reality, the CPU 12 is configured to generate a waveform signal for haptic presentation of a sense of shock when the character was hit.

Further, for example, when the character is dancing to the music in the virtual reality, the CPU 12 is configured to generate a waveform signal for haptic presentation of a feeling of dynamism toward musical beat and rhythm.

In the exemplary aspect, the CPU 12 digitally encodes the generated waveform signal to generate haptic information, and outputs the generated haptic information to the controller 21 via the communication interface 17.

Further, the CPU 12 is configured to generate screen information required for video display such as the character moving in the virtual reality and the background, and outputs the generated screen information to the GPU 16. For example, the GPU 16 receives the screen information from the CPU 12, performs rendering and the like based on the screen information, and generates a digital video signal including a video such as 3D graphics. The GPU 16 transmits the generated digital video signal to the display monitor 20 to display the 3D graphics and the like on the display monitor 20.

Further, the CPU 12 is configured to generate audio information indicative of audio according to the environment, movement, and situation of the character in the virtual reality, and outputs the generated audio information to the audio interface 15. For example, the audio interface 15 receives the audio information from the CPU 12, performs rendering and the like based on the received audio information, and generates an audio signal. The audio interface 15 then is configured to transmit the generated audio signal to the speaker 19 to output audio from the speaker 19.

The haptic element 25 in the controller 21 is a vibration actuator that is configured to convert an electronic signal to mechanical vibration, which is, for example, a voice coil actuator with a wide frequency band of vibration dampening. It is noted that the haptic element 25 may also be an eccentric motor, a linear resonant actuator, an electromagnetic actuator, a piezoelectric actuator, an ultrasonic actuator, an electrostatic actuator, a polymer actuator, or the like according to alternative aspects. It is also noted that the number of haptic elements in the controller 21 may be one, or two or more.

Moreover, the MCU 22 is configured to control the haptic output driver 24 and the sensor input driver 26. Specifically, for example, when power is supplied, the MCU 22 reads a program stored in a ROM (not illustrated) to execute arithmetic processing according to the content of the program.

In the exemplary embodiment, for example, when receiving the haptic information from the computer 11 via the communication interface 23, the MCU 22 controls the haptic output driver 24 based on the received haptic information to perform haptic presentation by the haptic element 25.

Specifically, the MCU 22 outputs the haptic information to the haptic output driver 24. The haptic output driver 24 receives the haptic information from the MCU 22, generates an analog electronic signal as an electronic signal according to the waveform signal and configured for driving the haptic element 25 based on the received haptic information, and outputs the electronic signal to the haptic element Thus, the haptic element 25 is configured to vibrate based on the electronic signal to perform haptic presentation.

The sensor element 27 senses the movements of operation parts operated by the user such as a joystick and a button provided in the controller 21, and outputs an analog electronic signal indicative of the sensing results to the sensor input driver 26.

For example, the sensor input driver 26 operates under the control of the MCU 22 to supply, to the sensor element 27, power required to drive, and receives an electronic signal from the sensor element 27 to convert the received electronic signal to a digital signal. The sensor input driver 26 outputs the converted digital signal to the MCU 22. Based on the digital signal received from the sensor input driver 26, the MCU 22 generates operation information indicative of the details of operations of the user to the controller 21, and transmits the operation information to the computer 11 via the communication interface 23.

[Configuration of Signal Generation Device]

FIG. 2 is a block diagram illustrating the configuration of a signal generation device according to an exemplary embodiment. For example, a signal generation device 1 is implemented by configuring the CPU 12 in the computer 11 to execute a signal generation program (e.g., stored in memory 13) as an example of the target program.

As shown, the signal generation device 1 includes, as functional blocks, a direction input unit 202 that accepts setting information including information indicative of the direction of a haptic sensation to be presented from the target object (e.g., the sensation experienced by a user holding the target object), and a signal generation unit 206 that generates a waveform signal for presenting the haptic sensation based on the setting information accepted by the direction input unit 202. It is easier for the user to grasp the setting information, indicative of the direction of the haptic sensation to be presented from the target object, as a sensation that can be more intuitively felt by the haptic sensation, than setting information indicative of the frequency and amplitude of the vibration for generating the haptic sensation. Therefore, according to the signal generation device 1 of the exemplary embodiment, more intuitive settings of the haptic sensation to be presented can be configured. Further, since the direction in which the haptic sensation is presented can be set more intuitively, it is easier to present, to the user, such a haptic sensation as to give the user a more realistic feeling.

Further, the signal generation device 1 includes an intensity input unit 203 that accepts setting information including information indicative of the intensity of the haptic sensation to be presented from the target object. Further, the signal generation device 1 includes a time axis setting unit 201, a parameter generation unit 204, and a basic waveform registration unit 205. Further, the time axis setting unit 201, the direction input unit 202, and the intensity input unit 203 may include the function of controlling the display of a user interface (graphical user interface) on the display monitor 20 by the signal generation device 1. Each functional block will be described below in more detail.

According to the exemplary aspect, the time axis setting unit 201 sets the length of a signal generated for haptic presentation, that is, the time axis setting unit 201 sets the time axis of the haptic sensation to be presented. The time axis of the haptic sensation may include information on the timing of starting or ending of the haptic presentation. For example, the time axis setting unit 201 may set the time axis of the haptic sensation according to user input through the operation parts, or may set a predetermined time axis. Further, the time axis setting unit 201 can be configured to set a degree of resolution (e.g., frequency) of the haptic sensation to be presented according to user input.

The degree of resolution of the haptic sensation to be presented means the granularity (unit) of the haptic sensation settable or editable by a method to be described later. For example, when the degree of resolution is set in ⅓₀ [second], the haptic sensation (for example, to set the direction or intensity) can also be set in units of ⅓₀ of a second.

The time axis of the haptic sensation to be presented may also be set based on a reference waveform. For example, the reference waveform is a waveform that can be obtained by analyzing data convertible to a waveform such as audio data or video data. For example, the time axis setting unit 201 analyzes the audio data or the video data acquired according to user input to set the reference waveform. Based on the length (e.g., time length) of the set reference waveform, the time axis setting unit 201 may set the time axis of the haptic sensation to be presented. It is noted that the audio data or the video data are acquired through media or in a streaming format, but the data acquisition method or format may be any other method or format.

The time axis setting unit 201 performs processing for transmitting information on the time axis, the degree of resolution, and the reference waveform set as mentioned above from the signal generation device 1 to the display monitor 20. The display monitor 20 controls the display based on the received information on the time axis, the degree of resolution, and the reference waveform.

Figure 3:
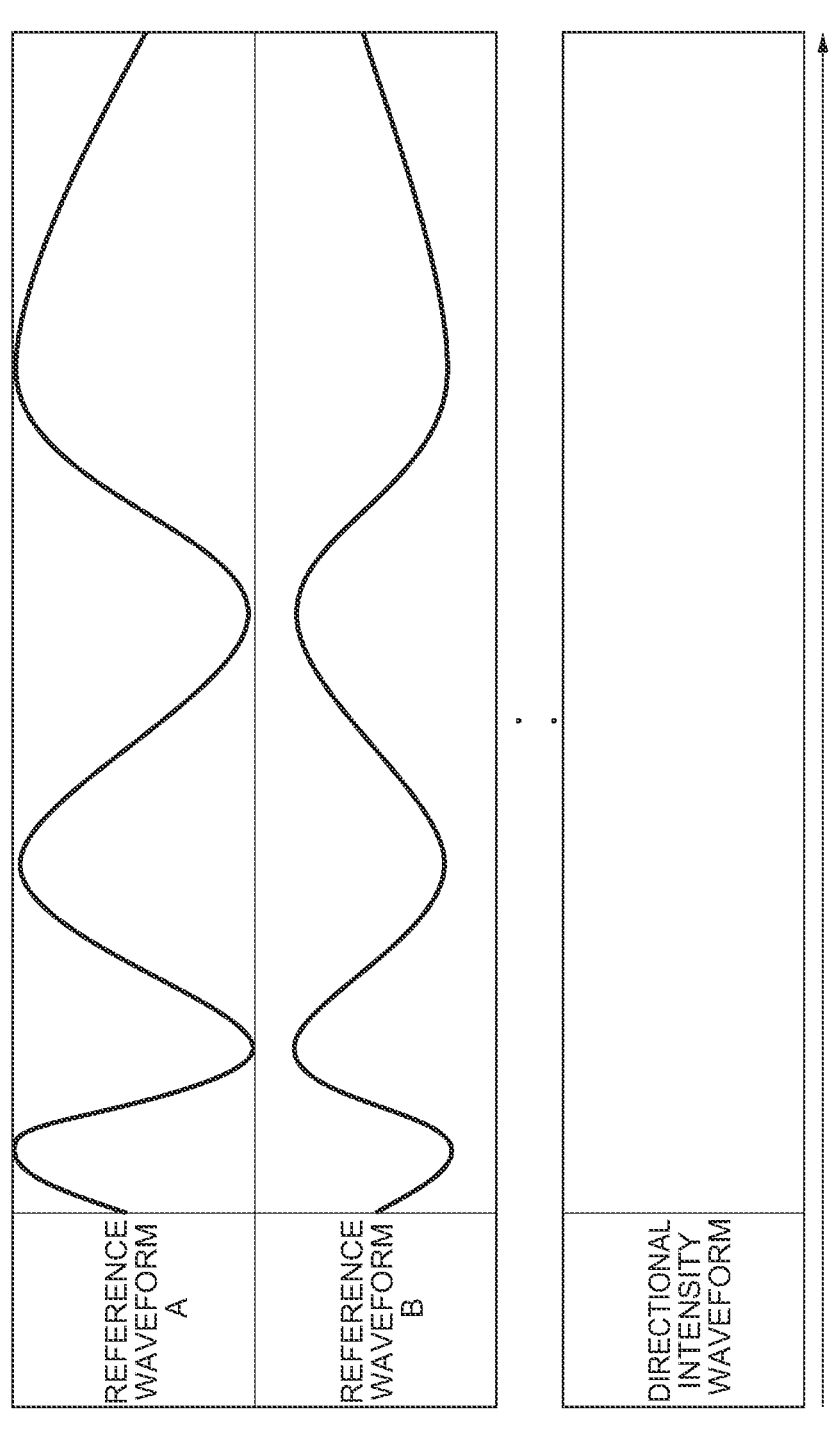
FIG. 3 is a diagram for describing an example of a user interface according to an exemplary embodiment.

FIG. 3 illustrates an example of a user interface image (hereinafter simply called a "user interface") displayed on the display monitor 20 based on the time axis, the degree of resolution, and the reference waveform received by the display monitor 20. In FIG. 3, "reference waveform A" and "reference waveform B" as reference waveforms are illustrated along the time axis direction. Further, in FIG. 3, the time axis of a "directional intensity waveform" is illustrated as the time axis of the haptic sensation. In the example illustrated in FIG. 3, the time axis of the haptic sensation, the start and end of which are matched with the start and end of the time axis of "reference waveform A" and "reference waveform B," and which is lined up with the time axis of "reference waveform A" and "reference waveform B," is displayed. In other words, the time axis of the haptic sensation is set to the same length as the time axis of "reference waveform A" and "reference waveform B."

The user can generate or edit the haptic sensation to be present on the set time axis while referring to the image displayed on the display monitor 20 as illustrated in FIG. 3. For example, the user can specify the direction and intensity of the haptic sensation to be presented on the time axis while referring to the "reference waveform A" and the "reference waveform B."

Further, the user can generate a waveform of the haptic sensation based on the reference waveform. For example, the user can generate the waveform of the haptic sensation based on data obtained by filtering the "reference waveform A" or the "reference waveform B" or based on part of the data of the reference waveform concerned. Further, the user can edit the direction or intensity of the waveform of the haptic sensation generated based on the reference waveform by a method to be described later. The generated or edited waveform of the haptic sensation is displayed on the image, for example, as illustrated in FIG. 3 along the time axis direction as a "directional intensity waveform."

As another example, the time axis setting unit 201 can also set the time axis or the degree of resolution of the haptic sensation based on user operations without displaying or using the reference waveform.

The direction input unit 202 is configured to set a direction of presenting the haptic sensation. The direction of presenting the haptic sensation is a direction with respect to the position of the target object (for example, the controller 21) that presents the haptic sensation. For purposes of this disclosure, the phrase "the haptic sensation is presented in a forward direction" means the haptic sensation (that is, such a sensation that the target object is pulled in the forward direction, or the physical quantity such as torque to pull the target object in the forward direction) is presented continuously in a period of time set in the forward direction with respect to the position of the target object. The period is set along the time axis to present the haptic sensation to be described later. The direction input unit 202 can set the direction of continuously presenting the haptic sensation to any direction such as an up-down direction, a right-left direction, a forward-backward direction, or an oblique direction.

For example, the direction input unit 202 sets a direction of the haptic sensation to be presented at specified timing based on user input. In other words, the set direction of the haptic sensation (e.g., setting information) is associated with a time on the timeline (e.g., time axis) of the haptic sensation to be presented from the target object. The direction input unit 202 performs processing for transmitting necessary information from the signal generation device 1 to the display monitor 20 to display, on the display monitor 20, a user interface for setting the direction of the haptic sensation based on user input.

Figure 4:
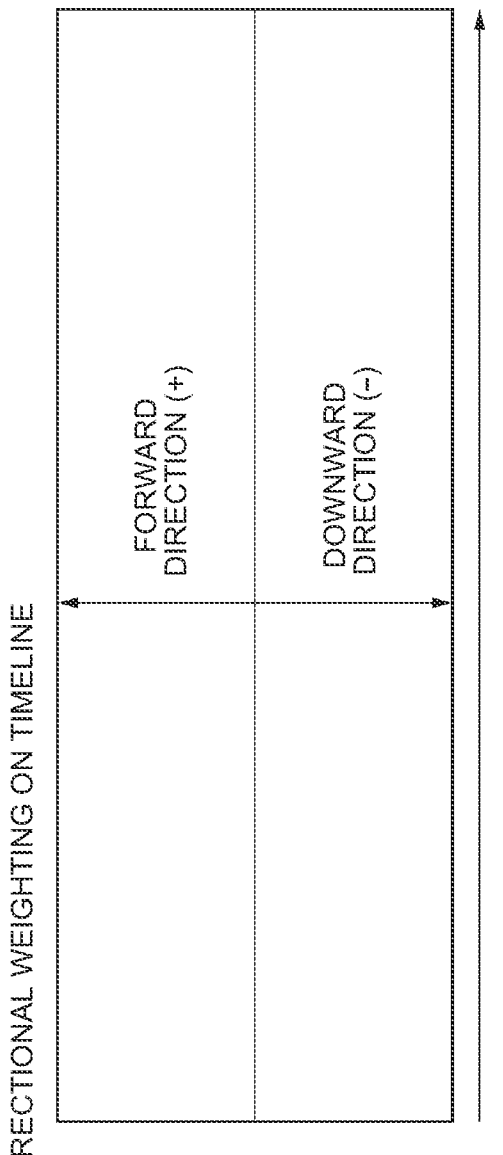
FIG. 4 is a diagram for describing an example of a user interface according to an exemplary embodiment.

FIG. 4 illustrates an example of an image displayed on the display monitor 20 as the user interface for setting the direction of the haptic sensation based on user input. For example, when the user selects a desired position in the image illustrated in FIG. 4 through an operation part, the direction of the haptic sensation corresponding to the selected position is set. For example, when an area indicated as "forward direction (+)" is selected, the haptic sensation is set to be presented in the forward direction, while when an area indicated as "downward direction (−)" is selected, the haptic sensation is set to be presented in the downward direction. Further, the haptic sensation in the set direction is set to be presented at timing according to the position on the time axis corresponding to the selected position (that is, the position on the lateral axis). In other words, the user can set the direction of the haptic sensation and the timing of presenting the haptic sensation in the direction through the user interface as illustrated in FIG. 4. As a result, according to the exemplary embodiment, the haptic sensation to be presented is intuitively settable.

According to an exemplary aspect, the intensity input unit 203 is configured to set an intensity to present the haptic sensation. For example, based on user input, the intensity input unit 203 sets the intensity of the haptic sensation to be presented at the specified timing. In other words, the set intensity of the haptic sensation (e.g., setting information) is associated with the time on the timeline of the haptic sensation to be presented from the target object. The intensity input unit 203 performs processing for transmitting necessary information from the signal generation device 1 to the display monitor 20 to display, on the display monitor 20, a user interface for setting the intensity of the haptic sensation based on user input.

Figure 5:
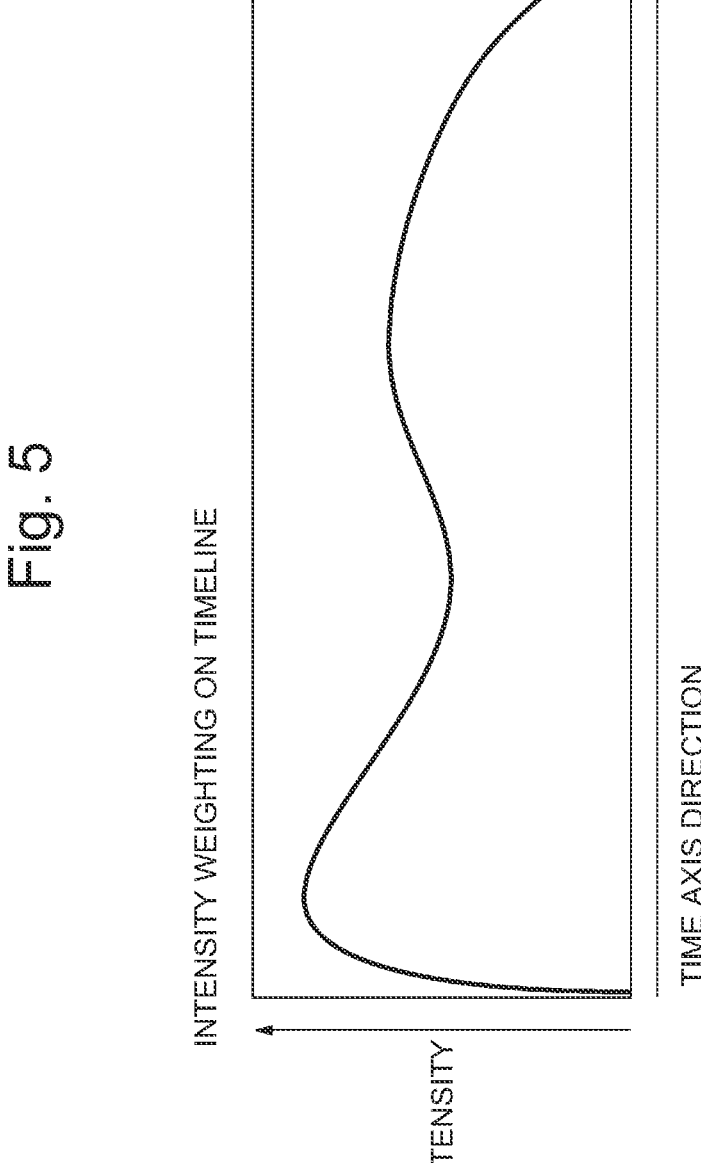
FIG. 5 is a diagram for describing an example of a user interface according to an exemplary embodiment.

FIG. 5 illustrates an example of an image displayed on the display monitor as the user interface for setting the intensity of the haptic sensation based on user input. A waveform illustrated in the image of FIG. 5 indicates the intensity of the haptic sensation to be presented at each timing on the time axis. The horizontal axis of the image in FIG. 5 is the time axis of the haptic sensation to be presented, and the vertical axis is the intensity of the haptic sensation to be presented. For example, the user can deform the shape of the waveform as illustrated in FIG. 5 to a desired shape through the operation parts to set the intensity of the haptic sensation according to the deformed shape of the waveform. In other words, the user can set the intensity of the haptic sensation and the timing of presenting the haptic sensation at the intensity through the user interface as illustrated in FIG. 5. As a result, according to the exemplary embodiment, the haptic sensation to be presented is intuitively settable.

Based on information set by the direction input unit 202 and information set by the intensity input unit 203, the parameter generation unit 204 is configured to generate haptic parameters to be presented. More specifically, the parameter generation unit 204 generates parameters of the direction and intensity of the haptic sensation associated with the timing of presenting the haptic sensation. For example, the parameter generation unit 204 can generate the parameters indicative of the direction and intensity of the haptic sensation by indicating the direction of presenting the haptic sensation by a sign (for example, "+" (plus) or "−" (minus)), indicating the intensity of the presented haptic sensation by a numerical value, and combining the sign and the numerical value. Further, the parameter generation unit 204 can associate the parameters indicative of the direction and intensity of the haptic sensation with a parameter indicative of the timing to generate the parameters of the direction and intensity of the haptic sensation associated with the timing of presenting the haptic sensation.

According to the exemplary embodiment, as described with reference to FIG. 4 and FIG. 5, the information (e.g., setting information) on the direction and intensity of the haptic sensation set along the time axis may also include information based on user input through the user interface, and the parameter generation unit 204 may also generate the presented haptic parameters based on the setting information.

In the exemplary embodiment, the method in which the direction of the haptic sensation is set by the direction input unit 202 and the intensity of the haptic sensation is set by the intensity input unit 203 is described, but the present invention is not limited to this method. For example, the parameter generation unit 204 can be configured to set the direction and intensity of the haptic sensation to be presented at predetermined timing at the same time to generate parameters based on the settings according to an alternative aspect. In this case, for example, the parameter generation unit 204 performs processing for transmitting necessary information from the signal generation device 1 to the display monitor 20 to display, on the display monitor 20, a user interface for setting the direction and intensity of the haptic sensation based on user input.

Figure 6:
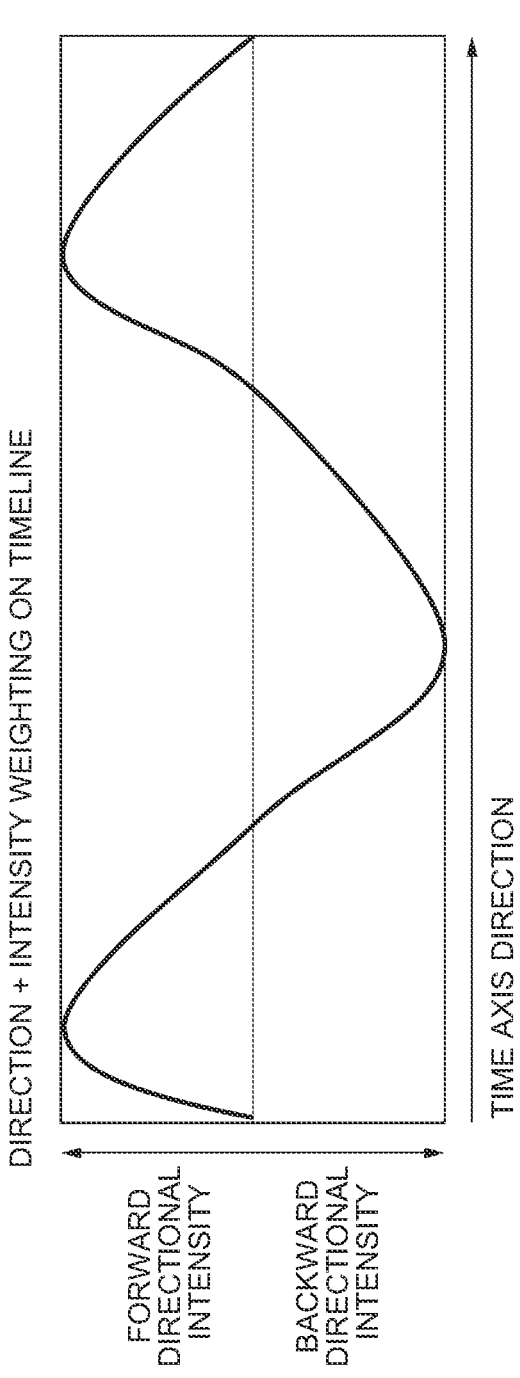
FIG. 6 is a diagram for describing an example of a user interface according to an exemplary embodiment.

FIG. 6 illustrates an example of an image displayed on the display monitor 20 as the user interface for setting the direction and intensity of the haptic sensation based on user input. The horizontal axis of the image in FIG. 6 is the time axis of the haptic sensation to be presented, and the vertical axis is the intensity of the haptic sensation to be presented. A waveform illustrated in the image of FIG. 6 indicates the direction and intensity of the haptic sensation to be presented at each timing on the time axis. In the image of FIG. 6, an area on the upper side (i.e., plus side) as an area of "forward directional intensity" indicates the haptic sensation in the forward direction. The higher the position, the stronger the intensity of the haptic sensation. An area on the lower side (i.e., minus side) as an area of "backward directional intensity" indicates the haptic sensation in the backward direction. The lower the position, the stronger the intensity of the haptic sensation. In other words, in the example of FIG. 6, the haptic sensation in the forward direction is set to be continuously present at an intensity according to the vertical axis position in a period in which the waveform is in the area of "forward directional intensity," and the haptic sensation in the backward direction is set to be continuously presented at an intensity according to the vertical axis position in a period in which the waveform is in the area of "backward directional intensity."

For example, the user can deform the shape of the waveform image as illustrated in FIG. 6 to a desired shape through the operation parts to set the direction and intensity of the haptic sensation according to the deformed shape of the waveform. The parameter generation unit 204 generates haptic parameters to be presented according to the shape of the deformed waveform image. In other words, based on image operations through the user interface as illustrated in FIG. 6, the user can set information (e.g., setting information) including the direction and intensity of the haptic sensation, and the timing of presenting the haptic sensation in the direction with the intensity. As a result, according to the exemplary embodiment, the haptic sensation to be presented is intuitively settable.

As another example of the method of setting the direction and intensity of the haptic sensation through the user interface, the user may specify, through the operation parts, waveform curve points each representing the direction, intensity, and timing of the haptic sensation to be presented, and the parameter generation unit 204 may generate a waveform that connects (e.g., interpolates) between the specified curve points. Further, the curve gentleness or steepness (e.g., curve radius) of curve points may be settable according to user input. Based on the generated waveform, the parameter generation unit 204 generates haptic parameters to be presented. Since the waveform can be generated by specifying the curve points in this way, operation input by the user can be minimized and the haptic parameters can be generated in a short time.

Further, in the example described with reference to FIG. 6, two directions of the forward direction and the backward direction are settable, but the present invention is not limited to this example. The parameter generation unit 204 can be configured to also make the direction to present the haptic sensation settable through the user interface to any other direction in three dimensions, such as the up-down direction, the right-left direction, the forward-backward direction, and the oblique direction to generate parameters based on the settings. In this case, each of the upper side (i.e., plus side) and the lower side (i.e., minus side) of the user interface illustrated in FIG. 6 can be associated with the direction to present the haptic sensation according to user operations and the like. Further, the number of settable directions can be set to one direction, or three or more directions rather than the two directions.

Figure 7:
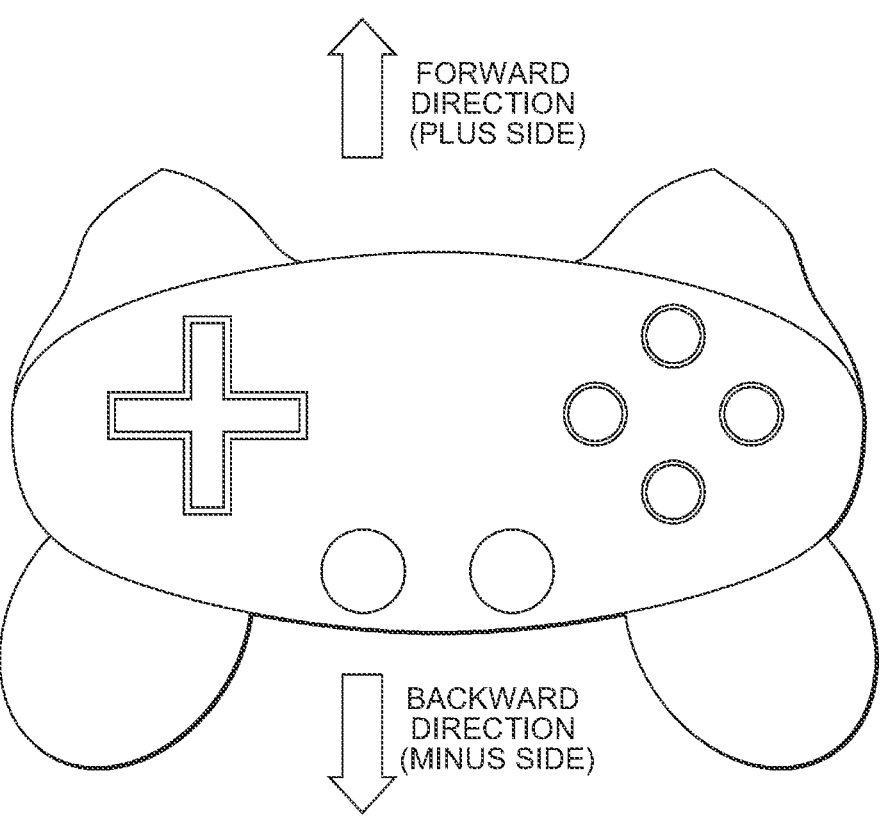
FIG. 7 is a diagram for describing an example of a user interface according to an exemplary embodiment.

Referring to FIG. 7, an example of a method for associating each of the upper side (i.e., plus side) and the lower side (i.e., minus side) of the user interface illustrated in FIG. 6 with the direction to present the haptic sensation according to user operations will be described. FIG. 7 illustrates an example of the user interface displayed on the display monitor 20. In FIG. 7, an image of the controller to present the haptic sensation and arrow images are illustrated. In the example illustrated in FIG. 7, one of two arrows indicates that the presentation of the haptic sensation in the forward direction is associated with the plus side, and the presentation of the haptic sensation in the backward direction is associated with the minus side. The user can change the association between each of the upper side (i.e., plus side) and the lower side (i.e., minus side) of the user interface illustrated in FIG. 6, and the direction to present the haptic sensation by changing, through the operation parts, the "forward direction" to the "upward direction," changing the "backward direction" to the downward direction," changing the positions of the arrow images, and the like.

In the above, the generation of a waveform indicative of the direction and intensity of the haptic sensation on the time axis with image operations or by specifying curve points through the user interface is described, but the waveform generation method is not limited thereto.

For example, the parameter generation unit 204 can also be configured to generate a waveform indicative of the direction and intensity of the haptic sensation to be presented on the time axis automatically (e.g., based on a predetermined algorithm). As an example of a method of automatically generating the waveform, the parameter generation unit 204 can also be configured to generate information (e.g., setting information) to set the direction and intensity of the haptic sensation to be presented along the time axis based on audio data or video data (or the reference waveform) as described above.

In this case, the parameter generation unit 204 can generate a waveform (that is, setting information on the direction and intensity of the haptic sensation along the time axis) indicative of the direction and intensity of the haptic sensation on the time axis based on data after filtering the audio data or the video data. For example, data on a predetermined frequency element may be extracted by filtering the audio data or the video data, and a waveform may be generated based on the extracted data.

Further, the parameter generation unit 204 can be configured to extract features of the audio data or the video data to generate, based on the features, a waveform (that is, setting information on the direction and intensity of the haptic sensation along the time axis) indicative of the direction and intensity of the haptic sensation on the time axis. Pattern recognition technology may be implemented to extract the features according to an exemplary aspect.

Further, artificial intelligence technology, such as machine learning or deep learning, can be implemented to generate the setting information on the direction and intensity of the haptic sensation along the time axis. For example, a model trained by using the features extracted from the audio data or the video data as explanatory variables, and information of the haptic sensation as an objective variable may be used to identify (e.g., generate) the information of the haptic sensation (including the setting information on the direction and intensity of the haptic sensation along the time axis) from the audio data or the video data. The trained model may be stored in a storage unit (not illustrated) of the signal generation device 1, or may be acquired from the outside of the signal generation device 1. The identification (e.g., generation) of the information of the haptic sensation using the trained model may be done by the parameter generation unit 204.

Otherwise, setting information or templates stored in a database may be selected by user input to piece the selected setting information or templates together in order to automatically set the direction and intensity of the haptic sensation along the time axis. Further, in collaboration with an input device connected to the signal generation device 1, the direction and intensity of the haptic sensation along the time axis may be automatically set based on input (for example, input according to motion capture or the movement of a mouse or the like). Further, in collaboration with a remote device using a remote network system, the direction and intensity of the haptic sensation along the time axis may be automatically set.

It is also possible to manually set the direction and intensity of the haptic sensation along the time axis. For example, the parameter generation unit 204 can be configured to acquire, based on user input, information on the direction and intensity of the haptic sensation associated with time information (for example, sequence data of parameters indicative of the time, direction, and intensity) to generate parameters based on the information.

Returning to the description of FIG. 2, the basic waveform registration unit 205 stores and registers basic waveform signals of vibrations of a haptic element (for example, the haptic element 25) for presenting a haptic sensation in a predetermined direction from the target object. Since the characteristics differ from haptic element to haptic element, even when the haptic element is vibrated by the same basic waveform signal, a haptic sensation different from haptic element to haptic element may be presented. Therefore, the basic waveform registration unit 205 may register basic waveforms different from haptic element to haptic element, or may register one basic waveform in a manner to be changeable according to the haptic element to present a haptic sensation in the same direction.

Basic waveform signals of vibrations of the haptic element 25 to present haptic sensations in predetermined directions from the target object include waveform signals of vibrations to present haptic sensations continuously in all three-dimensional directions such as up and down directions, right and left directions, forward and backward directions, and oblique directions. The basic waveform signals of vibrations of the haptic element 25 to present haptic sensations continuously in predetermined directions are generated by any method. For example, the basic waveform signals may be generated based on a method described in Japanese Patent No. 4111278, the contents of which are hereby incorporated by reference.

The signal generation unit 206 generates a waveform signal to present a haptic sensation based on setting information (or the generated parameters) accepted by the input unit (the direction input unit 202, the intensity input unit 203, or the parameter generation unit 204). For example, based on a combination of basic waveform signals for presenting a haptic sensation in a predetermined direction from the target object, the signal generation unit 206 generates a waveform signal for presenting the haptic sensation based on the setting information (or the generated parameters) accepted by the above input unit. More specifically, the signal generation unit 206 refers to the basic waveform registration unit 205 to identify one or more basic waveform signals for presenting the haptic sensation based on the setting information or the like accepted by the above input unit and combine the identified basic waveform signals in order to generate a waveform signal for presenting the haptic sensation based on the setting information or the like accepted by the above input unit.

Figure 8:
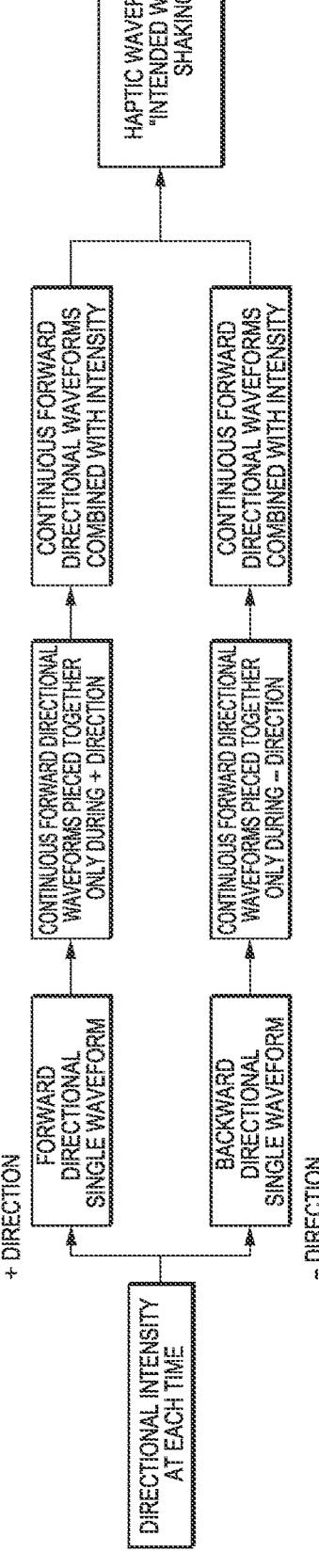
FIG. 8 is a diagram for describing an example of waveform signal generation processing according to an exemplary embodiment.
Figure 9:
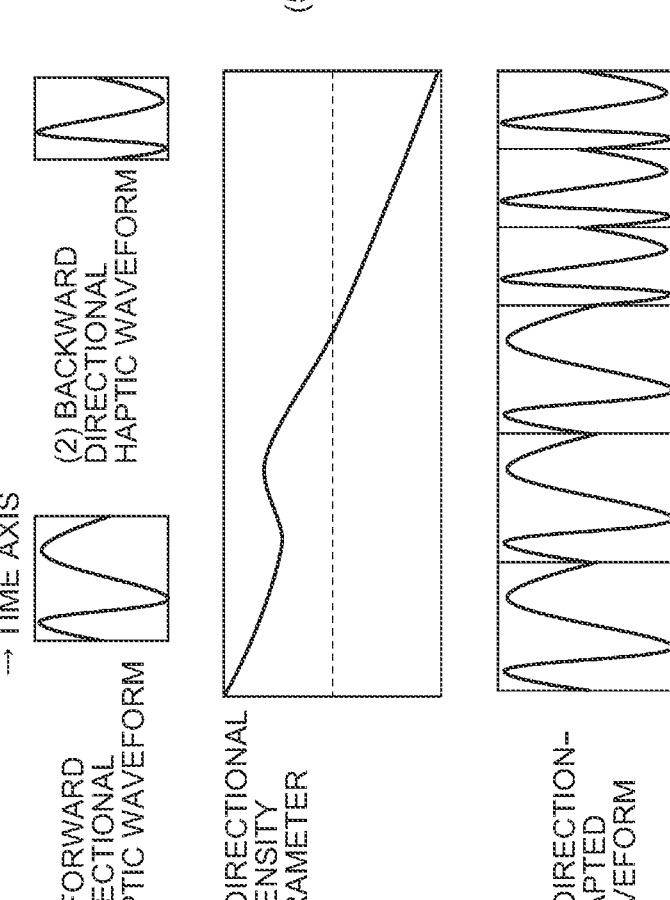
FIG. 9 is a diagram for describing an example of waveform signal generation processing according to an exemplary embodiment.

Referring to FIG. 8 and FIG. 9, a waveform signal generation method performed by the signal generation unit 206 to present a haptic sensation in the forward direction (+ direction) or the backward direction (− direction) at a predetermined intensity will be described in more detail. As illustrated in FIG. 8, the signal generation unit 206 acquires setting information (information on a directional intensity at each time) on a haptic sensation accepted by the above input unit. (3) in FIG. 9 conceptually illustrates an example of a waveform in which the direction and intensity of the haptic sensation based on the setting information are indicated on the time axis.

Next, the signal generation unit 206 refers to the basic waveform registration unit 205 to acquire, as basic waveform signals necessary to present the haptic sensation based on the above setting information, one or more signals of a forward directional single waveform and a backward directional single waveform. (1) in FIG. 9 conceptually illustrates an example of a forward directional single waveform, and (2) in FIG. 9 conceptually illustrates an example of a backward directional single waveform, respectively.

Next, in order to generate a waveform signal in a period indicating the forward direction (+ direction) by the above setting information, the signal generation unit 206 pieces together the corresponding forward directional single waveforms acquired as mentioned above (e.g., basic waveform signals) according to the set time axis. Further, in order to generate a waveform signal in a period indicating the backward direction (– direction) by the above setting information, the signal generation unit 206 pieces together the corresponding backward directional single waveforms acquired as mentioned above (e.g., basic waveform signals) according to the set time axis. (4) in FIG. 9 conceptually illustrates an example of basic waveform signals pieced together. In the period in which the forward directional single waveforms are pieced together, a waveform signal for continuously presenting a haptic sensation in the forward direction is generated, and in the period in which the backward directional single waveforms are pieced together, a waveform signal for continuously presenting a haptic sensation in the backward direction is generated.

Next, the signal generation unit 206 combines the intensity associated with the time axis indicated by the above setting information with the basic waveform signals pieced together, that is, the intensity is set. (5) in FIG. 9 conceptually illustrates an example of a waveform signal obtained by setting the intensity in the basic waveform signals pieced together.

According to an exemplary aspect, the above processing can generate a waveform signal for presenting a haptic sensation in a way of shaking the target object intended by the user (intended direction, intensity, and time axis) based on the intuitive settings in the forward direction, the backward direction, and the like.

EXAMPLES

Specific examples of the exemplary embodiment will be described below. It is noted that the exemplary embodiment can be carried out by various methods, and examples are not limited to those below.

Example 1

Figure 10:
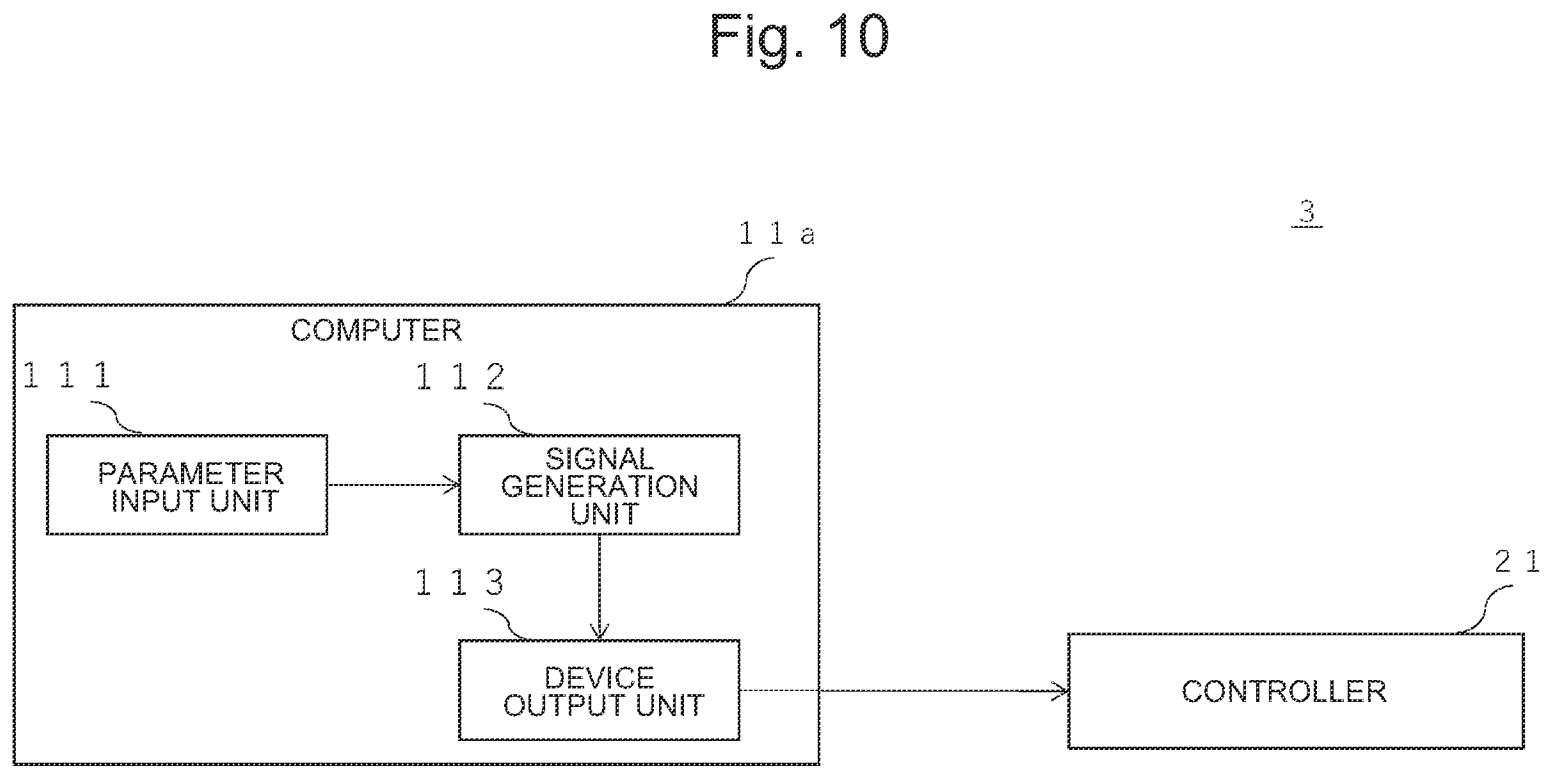

Referring to FIG. 10, Example 1 will be described. In Example 1, the game development system 3 includes at least one computer 11a and the controller 21. The computer 11a is a specific example of the computer 11. The game development system 3 may also include any component other than those described above. In this example and other examples, the game development system 3 can also be applied as a game running system in addition to the game development system. The computer 11a performs communication with the controller 21. The communication between the computer 11a and the controller 21 is performed by any method, which may be either wired communication or wireless communication, or may be communication through a network such as the Internet. The same applies to communication between the computer 11 and the controller 21 and communication between two or more computers 11 performed in other examples.

In Example 1, the computer 11a includes, as functional components, a parameter input unit 111, a signal generation unit 112, and a device output unit 113.

The parameter input unit 111 can be configured to input, to the signal generation unit 112, haptic parameters to be presented. Processing by the parameter input unit 111 may correspond to processing by at least some of the time axis setting unit 201, the direction input unit 202, the intensity input unit 203, the parameter generation unit 204, and the basic waveform registration unit 205 described with reference to FIG. 2.

The parameters input from the parameter input unit 111 to the signal generation unit 112 may be haptic parameters related to the direction or the intensity based on the features extracted from the audio data or the video data. Further, haptic parameters related to the direction or the intensity obtained by detecting the movement of the user identified with operations to the controller 21 or motion capture with respect to the time axis and generated based on the detection result in association with the time axis may be input from the parameter input unit 111 to the signal generation unit 112. The parameters input to the signal generation unit 112 may also be generated at random in association with the time axis. Haptic parameters related to the direction, or the intensity obtained by detecting the behavior of a character in a game animation and generated based on the detection result in association with the time axis may also be input from the parameter input unit 111 to the signal generation unit 112. The parameters input to the signal generation unit 112 may be haptic parameters pre-registered in association with the time axis.

Based on the parameters input from the parameter input unit 111, the signal generation unit 112 generates a waveform signal for presenting a haptic sensation, and outputs the waveform signal to the device output unit 113. Processing by the signal generation unit 112 may correspond to the processing by the signal generation unit 206 described above.

The device output unit 113 is a communication interface to transmit to the controller 21, the waveform signal output from the signal generation unit 112. The device output unit 113 is, for example, realized by the communication interface 17 described above.

Example 2

Referring to FIG. 11, Example 2 will be described. In Example 2, the functionality of the computer 11 described in Example 1 is implemented by two computers 11. In Example 2, the game development system 3 includes a computer 11b, a computer 11c, and the controller 21. The computer 11b and the computer 11c are specific examples of the controller 11. Each of the computer 11b and the computer 11c includes a hardware configuration similar to at least part of the hardware configuration of the controller 11 described above, respectively. The computer 11b performs communication with the computer 11c and the controller 21. Communication in this example is performed by any method, which may be wired communication or wireless communication, or may be communication through a network such as the Internet.

As illustrated in FIG. 11, the computer 11b includes, as functional components, the parameter input unit 111 and the device output unit 113. The computer 11c includes, as a functional component, the signal generation unit 112. In other words, in this example, parameters are input from the computer 11*b* to the computer 11*c*, and a signal is generated on the computer 11*c*. The generated signal is transmitted from the computer 11*c* to the computer 11*b*. Communication between the computer 11*b* and the computer 11*c* is realized through a reception interface or a transmission interface included in the computer 11*b* and the computer 11*c*. Since processing by the parameter input unit 111, the signal generation unit 112, and the device output unit 113 illustrated in FIG. 11 is the same as the processing in Example 1, the description thereof will be omitted here.

Example 3

Figure 12:
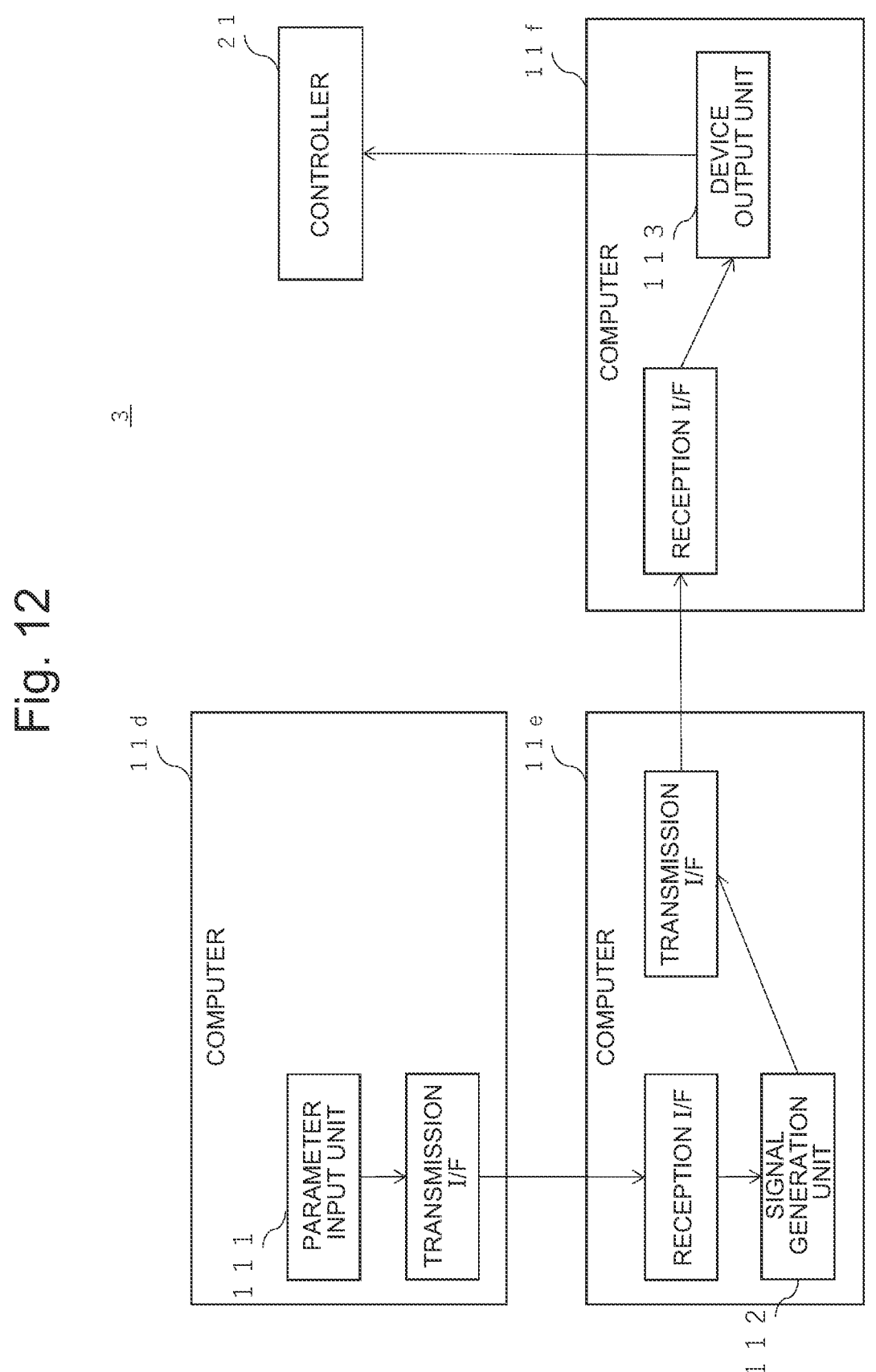
FIG. 12 is a block diagram illustrating still another example of the configuration of the signal generation device.

Referring to FIG. 12, Example 3 will be described. In Example 3, the functionality of the computer 11 described in Example 1 is implemented by three computers 11. In Example 3, the game development system 3 includes a computer 11*d*, a computer 11*e*, a computer 11*f*, and the controller 21. The computer 11*d*, the computer 11*e*, and the computer 11*f* are specific examples of the controller 11. Each of the computer 11*d*, the computer 11*e*, and the computer 11*f* includes a hardware configuration similar to at least part of the hardware configuration of the controller 11 described above, respectively. The computer 11*d* performs communication with the computer 11*e*. The computer 11*e* performs communication with the computer 11*f*. The computer 11*f* performs communication with the controller 21. Communication in this example is performed by any method, which may be wired communication or wireless communication, or may be communication through a network such as the Internet.

As illustrated in FIG. 12, the computer 11*d* includes the parameter input unit 111 as a functional component. The computer 11*e* includes the signal generation unit 112 as a functional component. The computer 11*f* includes the device output unit 113 as a functional component. In other words, in this example, parameters are input from the computer 11*d* to the computer 11*e*, and a signal is generated on the computer 11*e*. The generated signal is transmitted from the computer 11*e* to the computer 11*f*. Communication among the plural computers 11 is realized through a reception interface or a transmission interface included in the respective computers 11. Since processing by the parameter input unit 111, the signal generation unit 112, and the device output unit 113 illustrated in FIG. 12 is the same as the processing in Example 1, the description thereof will be omitted here.

Example 4

Figure 13:
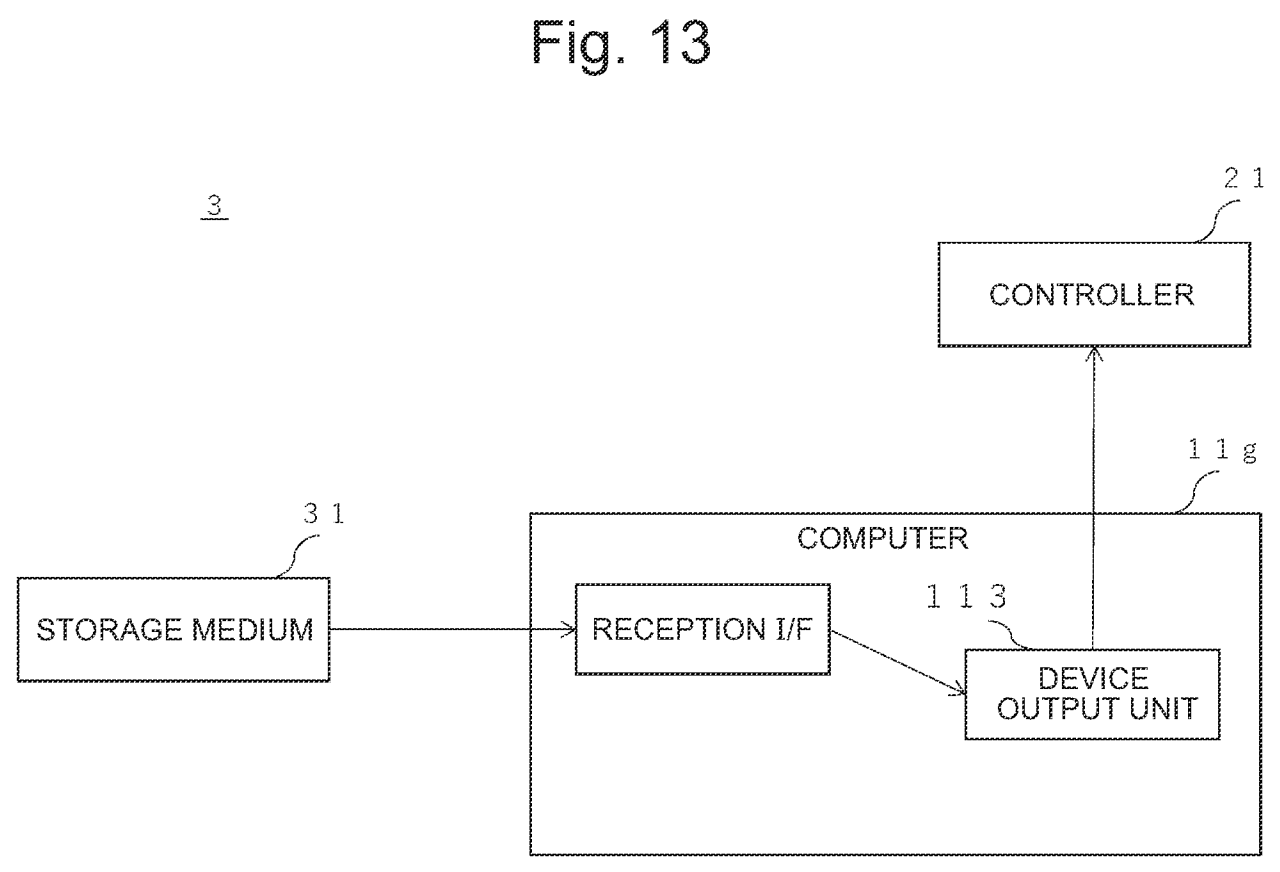

Referring to FIG. 13, Example 4 will be described. As illustrated in FIG. 13, the game development system 3 includes a computer 11*g* and a storage medium 31. In Example 4, a waveform signal for presenting a haptic sensation generated by the method of any one of Example 1 to Example 3 is stored on the storage medium 31, and the waveform signal is output from the storage medium 31 to the computer 11*g*. The storage medium 31 is configured by any method, which may be, for example, a readable/writable non-volatile storage device such as an HDD or an SSD, or any other storage medium such as a portable storage medium like a memory card or a read-only CD-ROM (or DVD-ROM). Communication for outputting the waveform signal from the storage medium 31 to the computer 11*g* is performed by any method. The computer 11*g* includes the device output unit 113 as a functional component. Since processing by the device output unit 113 is the same as the processing in Example 1, the description thereof will be omitted here.

<Modifications>

In the exemplary embodiments described herein, processing to generate a waveform signal for presenting a haptic sensation based on information (e.g., setting information) set according to image operations or automatic processing through the user interface is described, but the method of the processing to generate the waveform signal is not limited to this method.

For example, the setting information (the direction and intensity of the haptic sensation along the time axis) may also be generated based on text input through the user interface. In this case, the user who performs programming of a game program can input text of a function or method for generating the above setting information through the operation parts (e.g., by typing, mouse operations, and the like), and further input text of the setting information on the direction and intensity of the haptic sensation along the time axis as parameters for the function or method. After that, the signal generation unit 206 can be configured to generate a waveform signal for presenting the haptic sensation based on the text input.

It is generally noted that each embodiment described above is to make it easier to understand the present invention, and it is not intended to limit the interpretation of the present invention. The present invention can be changed/improved without departing from the scope thereof, and equivalents thereof are included in the present invention. Namely, any design change added to each embodiment by a person skilled in the art is included in the scope of the present invention as long as it has the features of the present invention. For example, each element, the arrangement, material, condition, shape, and size of the element, and the like included in each embodiment are not limited to those illustrated, and changes can be made appropriately. Further, each embodiment is just an illustrative example, and it is needless to say that configurations illustrated in different embodiments can be partially replaced or combined, and such a configuration is included in the scope of the present invention as long as it has the features of the present invention.

REFERENCE SIGNS LIST

1 . . . signal generation device
3 . . . game development system
11 . . . computer
19 . . . speaker
20 . . . display monitor
21 . . . controller
201 . . . time axis setting unit
202 . . . direction input unit
203 . . . intensity input unit
204 . . . parameter generation unit
205 . . . basic waveform registration unit
206 . . . signal generation unit

What is claimed:

1. A signal generation device comprising:

an input unit configured to accept setting information that includes first information indicative of a first direction and a second direction of a haptic sensation to be presented by a target object, and second information indicative of an intensity of the haptic sensation to be presented by the target object, the first direction, the second direction and the intensity being associated with a time on a timeline of the haptic sensation to be presented by the target object;

a generation unit configured to generate a waveform signal to generate the haptic sensation based on the setting information accepted by the input unit;

an image generating unit configured to generate an image including a waveform with a time axis representing the timeline, the waveform indicating the first information and the second information of the haptic sensation at each time on the timeline, the first direction and the second direction being indicated by a first side of the time axis and a second side of the time axis that is opposite to the first side; and an operation unit configured to edit the waveform in the image to change the setting information.

2. The signal generation device according to claim 1, wherein the setting information includes information based on a user input received by a user interface.

3. The signal generation device according to claim 1, wherein the setting information includes information based on a text input received by a user interface.

4. The signal generation device according to claim 1, wherein the setting information includes information based on image operations received by a user interface.

5. The signal generation device according to claim 1, wherein the setting information includes information based on at least one of audio data and video data.

6. The signal generation device according to claim 5, wherein the setting information includes information based on data after filtering the at least one of the audio data and the video data.

7. The signal generation device according to claim 5, wherein the setting information includes information based on features extracted from the at least one of the audio data and the video data.

8. The signal generation device according to claim 7, wherein the setting information includes information of a haptic sensation identified from at least one of the audio data and the video data using a model trained by using the features extracted from the at least one of the audio data and the video data as explanatory variables and the haptic sensation as an objective variable.

9. The signal generation device according to claim 1, wherein the generation unit is configured to generate the waveform signal based on a combination of basic waveform signals for presenting the haptic sensation in a predetermined direction by the target object.

10. The signal generation device according to claim 1, wherein the first direction of the haptic sensation is one of an up-down direction, a right-left direction, a forward-backward direction, or an oblique direction.

11. The signal generation device according to claim 1, further comprising at least one processor configured to execute a signal generation program stored on memory to configure a computer including the at least one processor as the generation unit to generate the waveform signal to generate the haptic sensation.

12. The signal generation device according to claim 1, wherein:

the operation unit is configured to perform an operation to change the first direction to a third direction; and the image generating unit is configured to generate the image including the waveform indicating the third direction, the second direction, and the intensity of the haptic sensation at each time on the timeline, with the third direction and the second direction being indicated by the first side of the time axis and the second side of the time axis respectively.

13. A signal generation method comprising:

accepting, by at least one processor, setting information that includes first information indicative of a first direction and a second direction of a haptic sensation to be presented by a target object, and second information indictive of an intensity of the haptic sensation to be presented by the target object, the first direction, the second direction and the intensity being associated with a time on a timeline of the haptic sensation to be presented by the target object;

generating, by the at least one processor, a waveform signal to present the haptic sensation based on the setting information that is accepted;

generating, by the at least one processor, an image including a waveform with a time axis representing the timeline, the waveform indicating the first information and the second information of the haptic sensation at each time on the timeline, the first direction and the second direction being indicated by a first side of the time axis and a second side of the time axis that is opposite to the first side; and editing, by the at least one processor, the waveform in the image to change the setting information.

14. The signal generation method according to claim 13, further comprising generating, by the at least one processor, the waveform signal based on a combination of basic waveform signals for presenting the haptic sensation in a predetermined direction by the target object.

15. The signal generation method according to claim 13, wherein the first direction of the haptic sensation is one of an up-down direction, a right-left direction, a forward-backward direction, or an oblique direction.

16. The signal generation method according to claim 13, further comprising receiving, by a user interface, a user input that indicates the setting information.

17. A signal generation system comprising:

memory that stores software code for a signal generation program; and at least one processor that, when executing the software code for the signal generation program, configures a computer to provide:

an input unit configured to accept setting information that includes first information indicative of a first direction and a second direction of a haptic sensation to be presented by a target object, and second information indicative of an intensity of the haptic sensation to be presented by the target object, the first direction, the second direction and the intensity being associated with a time on a timeline of the haptic sensation to be presented by the target object;

a generation unit configured to generate a waveform signal to present the haptic sensation based on the setting information accepted by the input unit;

an image generating unit configured to generate an image including a waveform with a time axis representing the timeline, the waveform indicating the first information and the second information of the haptic sensation at each time on the timeline, the first direction and the second direction being indicated by a first side of the time axis and a second side of the time axis that is opposite to the first side; and an operation unit configured to edit the waveform in the image to change the setting information.

18. The signal generation system according to claim 17, wherein the at least one processor, when executing the software code for the signal generation program, is further configured to provide the generation unit to generate the waveform signal based on a combination of basic waveform signals for presenting the haptic sensation in a predetermined direction by the target object.

19. The signal generation system according to claim 17, wherein the direction of the haptic sensation is one of an up-down direction, a right-left direction, a forward-backward direction, or an oblique direction.

\* \* \* \* \*